United States Patent
Liao (10) Patent No.: US 7,000,928 B2
(45) Date of Patent: Feb. 21, 2006

(54) THIRD WHEEL COLLAPSING DEVICE FOR A GOLF CLUB CART

(75) Inventor: Gordon Liao, Tainan Hsien (TW)

(73) Assignee: Unique Product & Design Co., Ltd., Tainan Hsien (TW)

(*) Notice: Subject to any disclaimer, the term of this patent is extended or adjusted under 35 U.S.C. 154(b) by 198 days.

(21) Appl. No.: 10/725,498

(22) Filed: Dec. 3, 2003

(65) Prior Publication Data

US 2005/0121865 A1 Jun. 9, 2005

(51) Int. Cl.
B62B 1/00 (2006.01)
B62D 61/06 (2006.01)
B60R 1/00 (2006.01)
B25G 3/18 (2006.01)
F16C 11/00 (2006.01)

(52) U.S. Cl. .................. 280/38; 280/654; 280/651; 280/62; 280/767; 280/DIG. 6; 403/324; 403/325; 403/92

(58) Field of Classification Search ............. 280/654, 280/651, 655, 646, 645, 47.34, 47.27, 47.24, 280/43.1, DIG. 6, 62, 767, 38; D34/15; 403/83, 84, 92, 95, 325, 324
See application file for complete search history.

(56) References Cited

U.S. PATENT DOCUMENTS

| | | | | |
|---|---|---|---|---|
| 4,289,324 A | * | 9/1981 | Nemeth | 280/38 |
| 4,657,100 A | * | 4/1987 | Lewis | 180/19.1 |
| 5,433,552 A | * | 7/1995 | Thyu | 403/378 |
| 5,865,560 A | * | 2/1999 | Mercat et al. | 403/322.4 |
| 6,131,917 A | * | 10/2000 | Walsh | 280/43.1 |
| 6,276,760 B1 | * | 8/2001 | Everett | 301/124.2 |
| 6,641,228 B1 | * | 11/2003 | Liu | 301/111.06 |
| 6,719,319 B1 | * | 4/2004 | Liao | 280/654 |
| 6,746,058 B1 | * | 6/2004 | Kienzler | 292/175 |

* cited by examiner

Primary Examiner—Christopher P. Ellis
Assistant Examiner—G B Klebe
(74) Attorney, Agent, or Firm—Bacon & Thomas PLLC (57) ABSTRACT

A third wheel collapsing device for a golf club cart includes a third wheel support frame having a U-shaped frame fixed pivotally with a third wheel and a hollow support arm fitted therein with a fit block. The support arm and the fit block respectively have insert holes and connecting holes. A support base assembled on the support arm has a pivotal shaft under the bottom and a threaded hole before the pivotal shaft for receiving an elastic lock member, which has an engage rod biased by a compression coil spring and controlled by a user. The support base has a fastening frame fixed with the lower end of the main frame of a golf club cart. When the engage rod is pulled and removed from the first insert hole of the support arm and the first connecting hole of the fit member, the third wheel support frame can be transversely collapsed.

3 Claims, 13 Drawing Sheets

THIRD WHEEL COLLAPSING DEVICE FOR A GOLF CLUB CART

BACKGROUND OF THE INVENTION

1. Field of the Invention

This invention relates to a third wheel collapsing device for a golf club cart, particularly to one able to collapse the third wheel of a golf club cart conveniently and position it stably when it is extended out for use.

2. Description of the Prior Art

Figure 1:
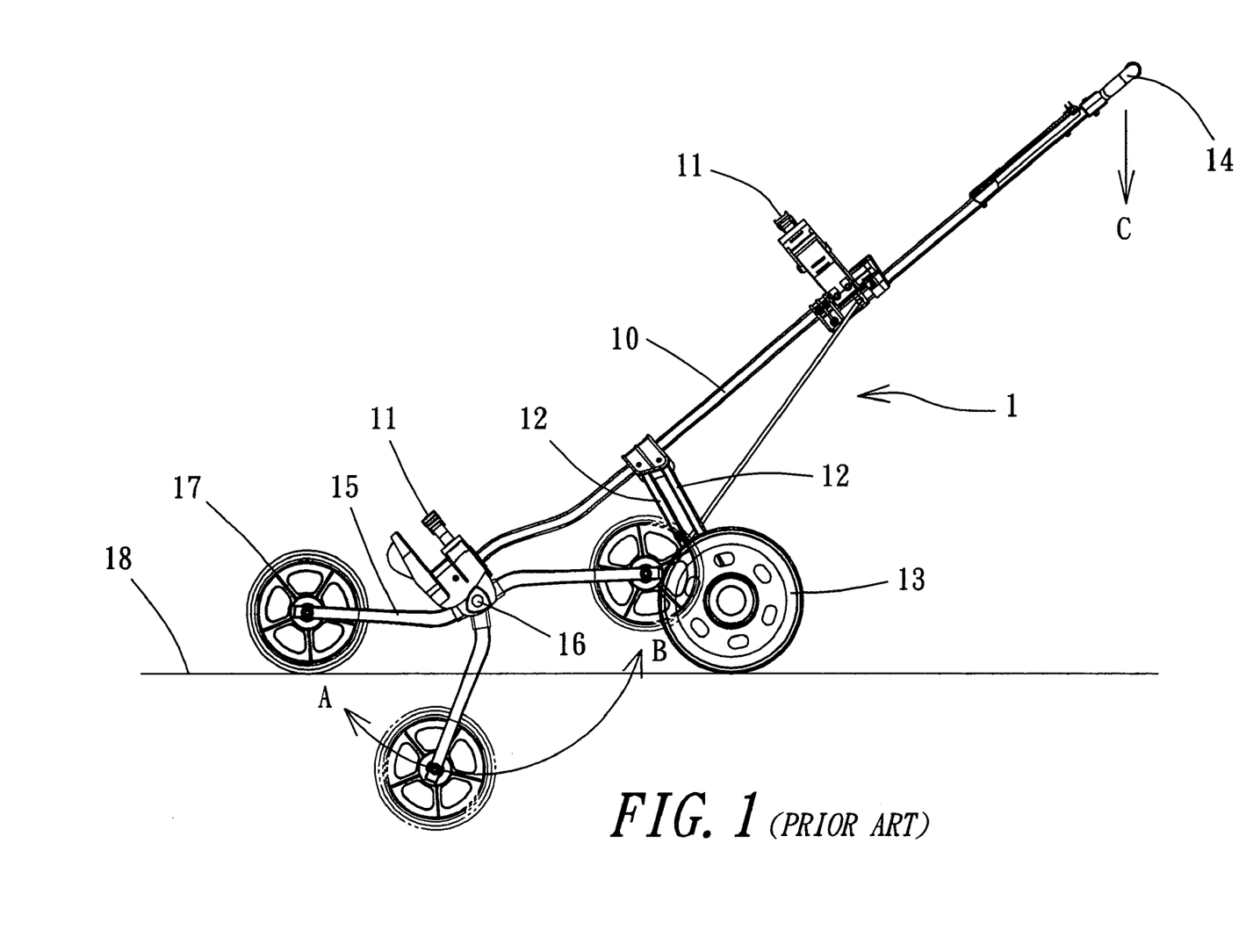
FIG. 1 is perspective view of a conventional golf club cart.

A conventional golf club cart 1, as shown in FIG. 1, includes a main frame 10 having two support members 11 respectively provided at the upper and the lower end for supporting and positioning a golf club bag. An intermediate support frame 12 is secured to an intermediate portion of the main frame 10, having its opposite ends respectively extending slantingly downward from the left and the right side of the main frame 10 and pivotally connected with a rear wheel 13. A handle 14 is provided at the upper end of the main frame 10 for controlling the golf club cart 1. A third wheel support frame 15 nearly parallel to the cart supporting surface 8 has one end pivotally fixed on the lower end of the main frame 10 by a bolt 16 and the other end pivotally connected with a third wheel 17 contacting with the cart supporting surface 18.

Although the third wheel collapsing device of the conventional golf club cart 1 can support a golf club bag and make a golf club cart move steadily, yet it has the following drawbacks in use.

1. Since the third wheel support frame 15 is positioned nearly parallel to the ground 18 and the third wheel 17 is fixed on the lower portion of the main frame 10 by the bolt 16, therefore, when the third wheel 17 is to be collapsed or extended outward for use, the bolt 16 has to be unscrewed first so as to make the third wheel support frame 15 movable. In addition, when the third wheel support frame 15 is collapsed or extended out for use, it will interfere with the ground 1 8, as shown in the directions indicated by arrows A and B in FIG. 1. Therefore, the handle 14 of the golf club cart has to be pressed downward, as shown in the direction indicated by an arrow C in FIG. 1, to swing up the lower portion of the golf club cart 1 to permit the third wheel support frame 15 to be collapsed or extended smoothly.

2. To extend or collapse the third wheel support frame 15, a user has to bend and screw or unscrew the bolt 16, causing inconvenience in operating.

3. In case the bolt 16 is not screwed tight, it is easy to fall off when the golf club cart is moving, likely to cause damage to the golf club cart.

SUMMARY OF THE INVENTION

A first objective of the invention is to offer a third wheel collapsing device for a golf club cart, able to quickly collapse or extend the third wheel of a golf club cart only by slightly pressing down the handle of the golf club cart to let the third wheel swing up a little and then turning it transversely.

A second objective of the invention is to offer a third wheel collapsing device for a golf club cart, able to extend outward the third wheel of a golf club cart and let it move steadily. For this purpose, the third wheel collapsing device is provided with a third wheel support frame which includes a U-shaped frame, a fit block and a support base. The U-shaped frame has its open end pivotally fixed with a third wheel and its closed end extending outward and forming a hollow support arm which is transversely bored with a first and a second insert hole. The fit block fitted in the hollow support arm is transversely bored with a first and a second connecting hole respectively matching with the two insert holes of the support arm. The support base assembled on the support arm has a pivotal shaft fixed under the bottom and inserted through both the second insert hole of the support arm and the second connecting hole of the fit block and then locked under the support arm by fasteners to position the support base on the support arm, with the support base able to move thereon. The support base is provided with a threaded hole in front of the pivotal shaft for receiving an elastic lock member therein. The elastic lock member is provided with an engage rod always pressed downward by a spring and having its lower end extending in both the first insert hole of the support arm and the first connecting hole of the fit block and its upper end extending out of the support base to be controlled by a user. The support base has its rear end secured with a fastening frame extending backward and upward to be fixedly assembled with the lower portion of the main frame of a golf club cart. To collapse the third wheel of the golf club cart, firstly, the engage rod is pulled upward and removed out of the first insert hole of the support arm and the first connecting hole of the fit block. Next, the handle of the golf club cart is slightly pressed down to let the third wheel separated from the cart supporting surface, and then the support arm, with the pivotal shaft serving as a central shaft, is turned transversely to collapse the third wheel.

BRIEF DESCRIPTION OF DRAWINGS

This invention will be better understood by referring to the accompanying drawings, wherein.

DETAILED DESCRIPTION OF THE PREFERRED EMBODIMENT

Figure 2:
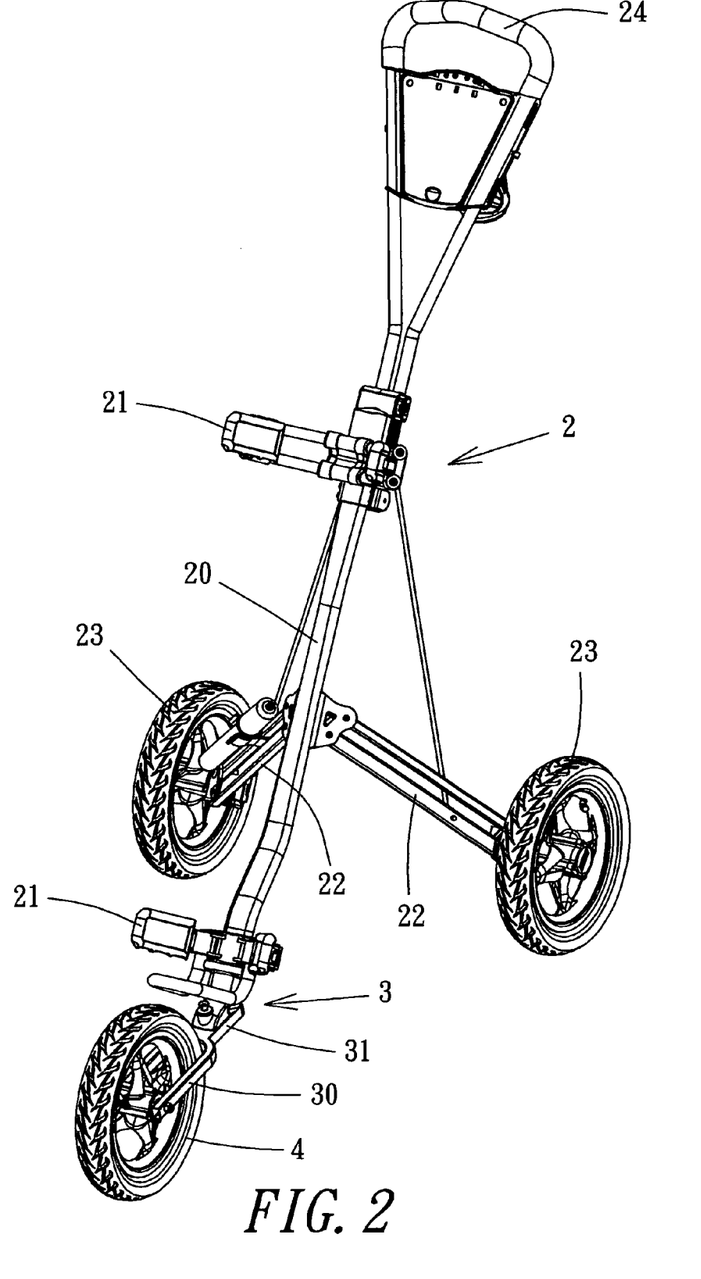
FIG. 2 is a perspective view of a first preferred embodiment of a golf club cart in the present invention.

A first preferred embodiment of a third wheel collapsing device for a golf club cart 2 in the present invention, as shown in FIG. 2, includes a main frame 20, an intermediate support frame 22, a handle 24, and a third wheel support frame 3 as main components combined together.

The main frame 20 has its upper and lower end respectively provided with a support member 21 for holding a golf club bag thereon.

The intermediate support frame 22 is transversely fixed on an intermediate portion of the main frame 20, having its opposite ends respectively slanting downward from the left and the right side of the main frame 20 and pivotally assembled with a rear wheel 23.

The handle 24 is secured to the upper end of the main frame 20 for steering the golf club cart.

Figure 3:
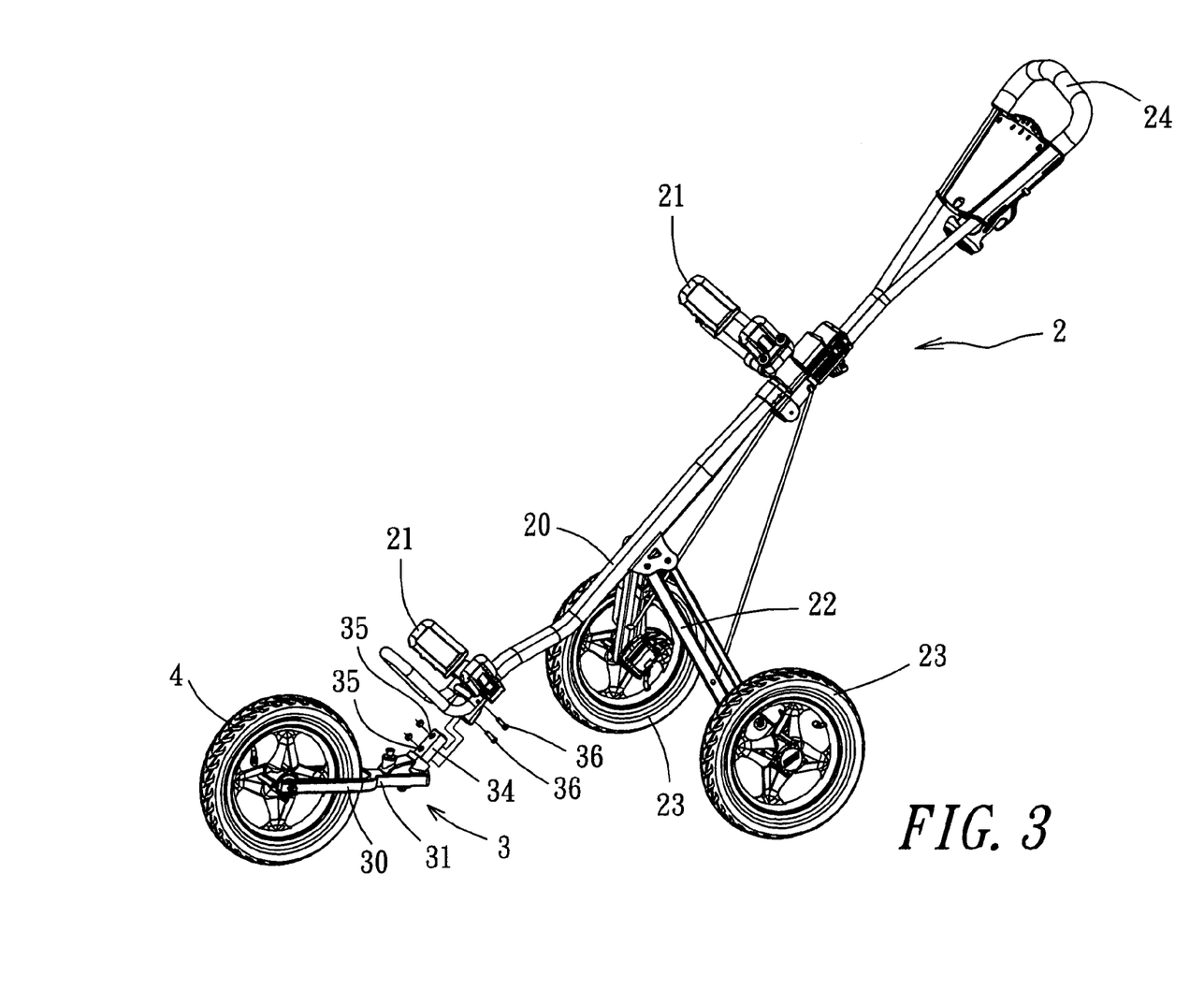
FIG. 3 is a perspective view of the first preferred embodiment of the third wheel of a golf club cart assembled in the present invention.
Figure 4:
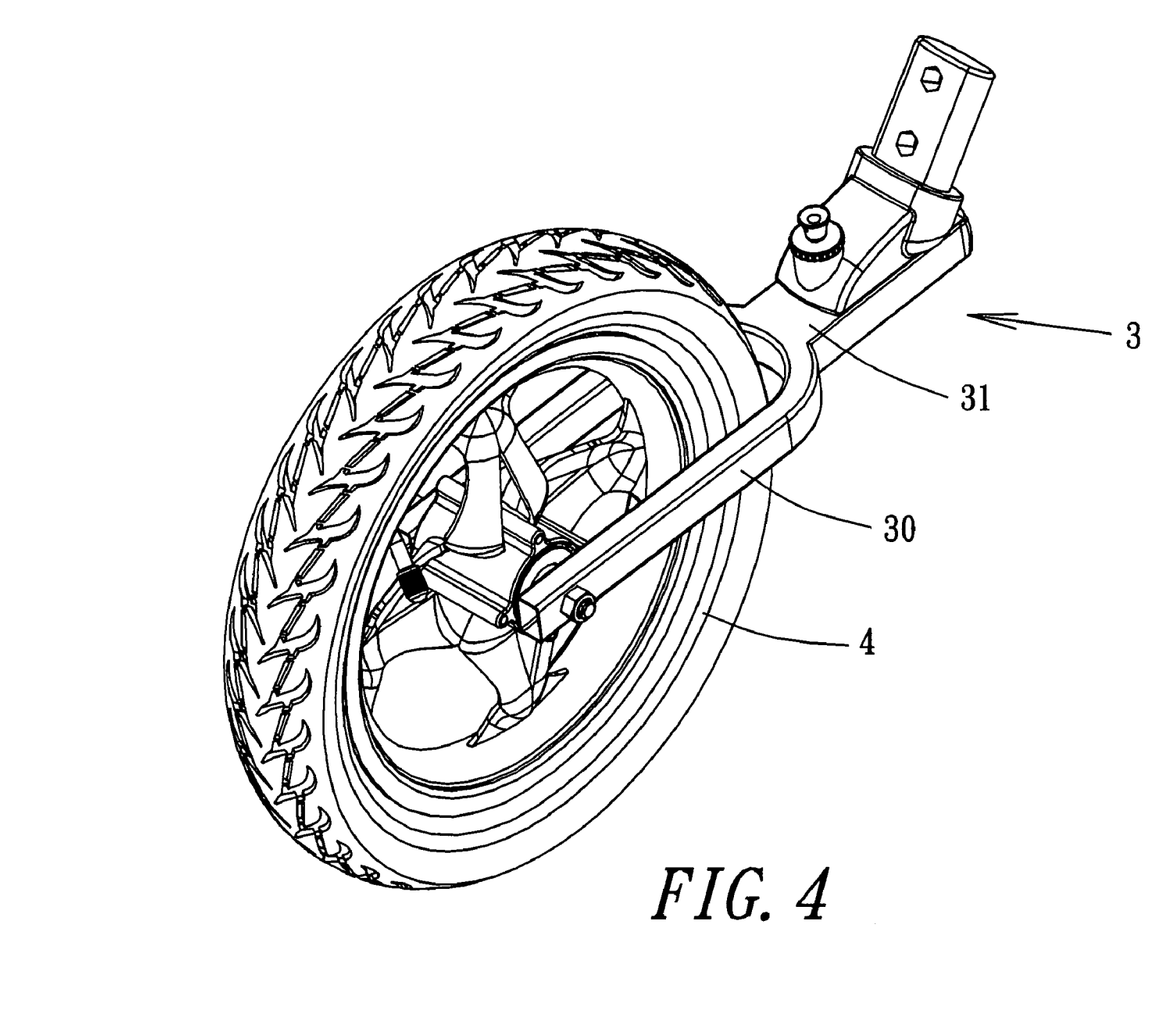
FIG. 4 is a perspective view of the first preferred embodiment of the third wheel of a golf club cart in the present invention.

The third wheel support frame 3, as shown in FIGS. 3 and 4, includes a U-shaped frame 30, a fit block 32 and a support base 33.

Figure 5:
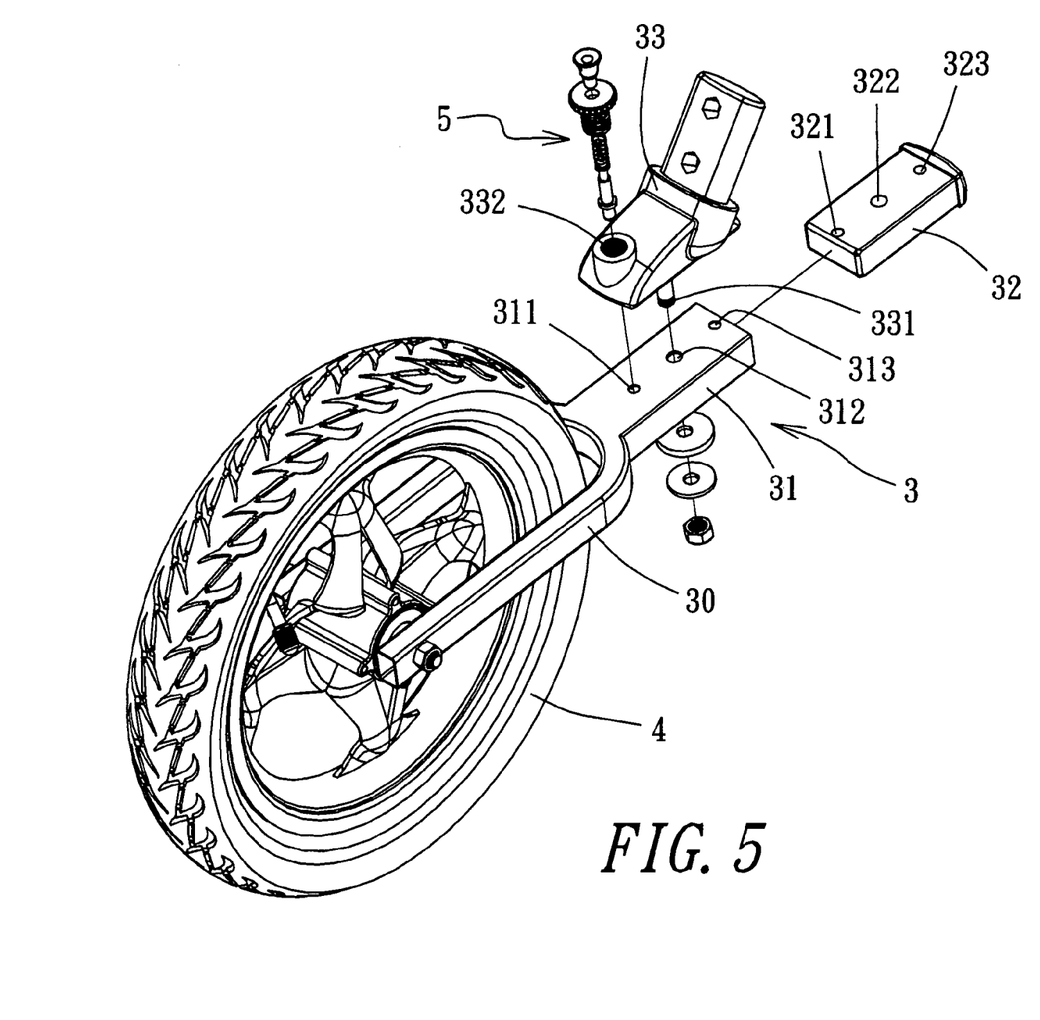
FIG. 5 is an exploded perspective view of the first preferred embodiment of a third wheel collapsing device for a golf club cart in the present invention.
Figure 6:
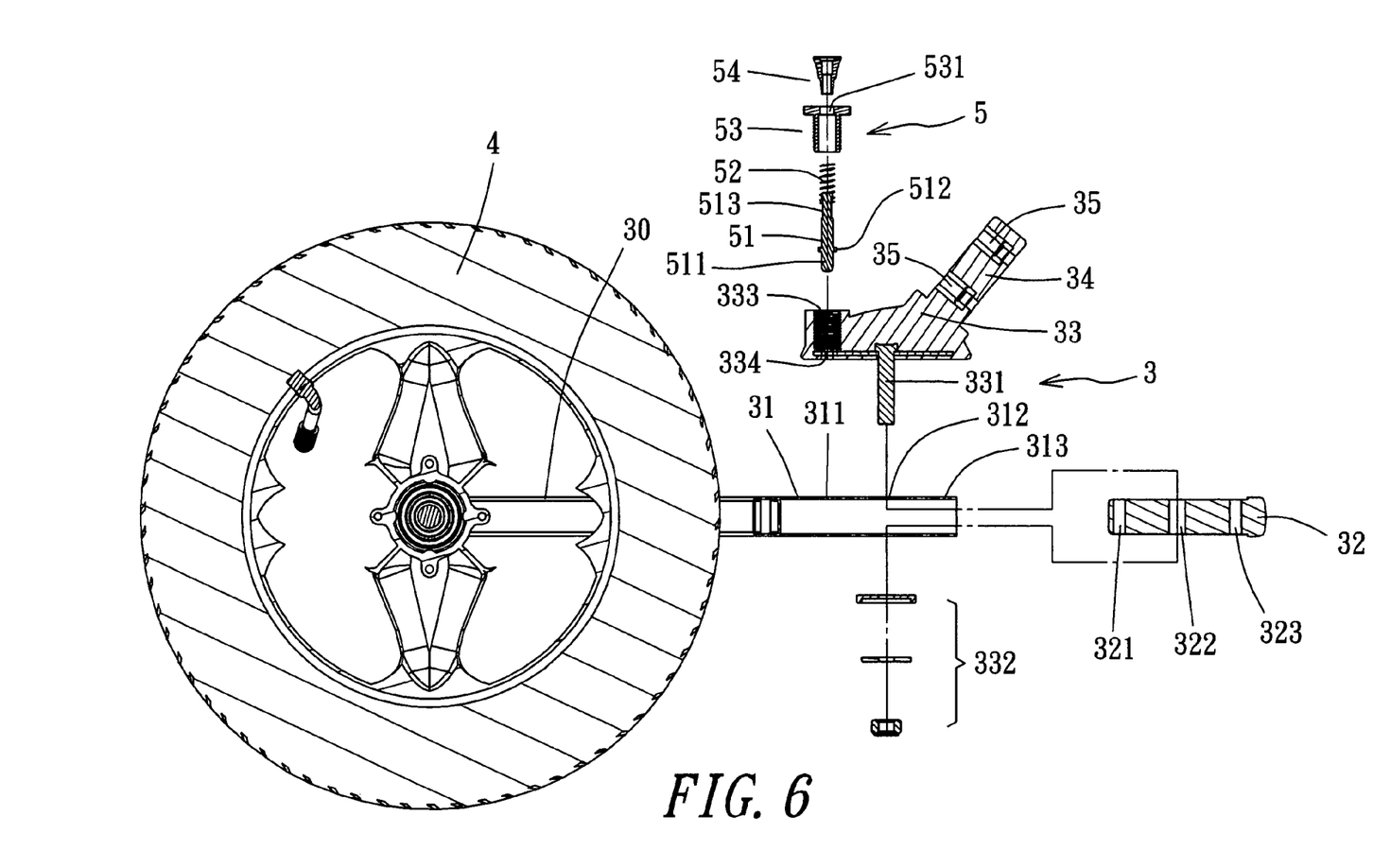
FIG. 6 is an exploded perspective and cross-sectional view of the first preferred embodiment of the third wheel collapsing device for a golf club cart in the present invention.

The U-shaped frame 30, as shown in FIGS. 5 and 6, has its open end assembled pivotally with a third wheel 4 and its closed end extending outward and forming a hollow support arm 31, which is transversely bored with a first insert hole 311, a second insert hole 312 and a third insert hole 313 spaced apart.

Figure 7:
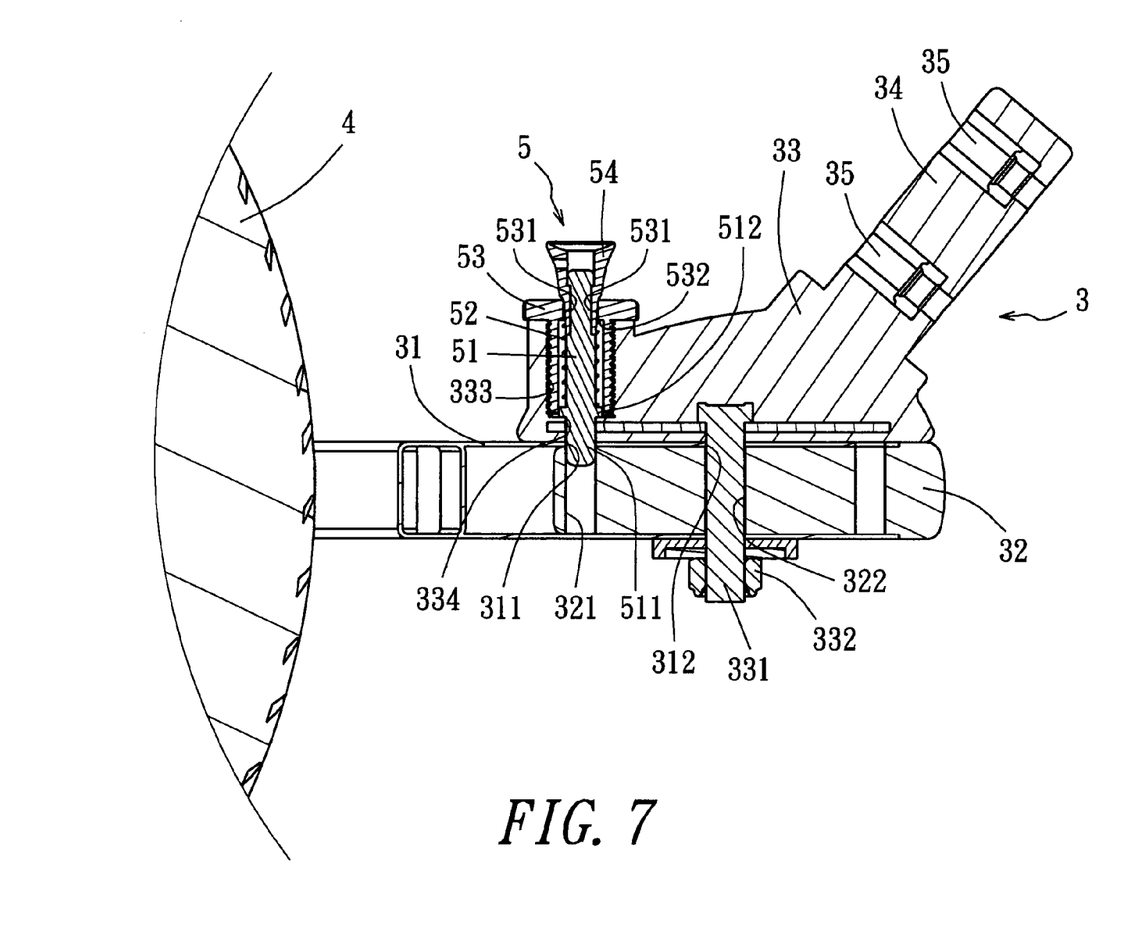
FIG. 7 is a magnified cross-sectional view of the first preferred embodiment of the third wheel support frame in an engaged condition in the present invention.

The fit block 32, as shown in FIGS. 5, 6 and 7, is fitted in the support arm 31 and transversely bored with a first connecting hole 321, a second connecting hole 322 and a third connecting hole 323 respectively matching with the first, the second and the third insert hole 311, 312, 313 of the support arm 31.

The support base 33 to be assembled on the support arm 31, as shown in FIGS. 5, 6 and 7, has a pivotal shaft 331 secured under the bottom and inserted through both the second insert hole 312 of the support arm 31 and the second connecting hole 322 of the fit block 32 and then locked under the support arm 31 by means of fasteners 332 to fix the support base 33 on the support arm 31, letting the support base 33 able to move axially thereon. The support base 33 further has a threaded hole 333 bored in front of the pivotal shaft 331 and having its lower portion formed with a connecting hole 334 with a comparatively small diameter to match with the first insert hole 311 of the support arm 31, with an elastic lock member 5 fitted in the threaded hole 333.

The elastic lock member 5 consists of an engage rod 51, a spring 52 fitted around the engage rod 51, a threaded base 53 fitted around the engage rod 51 and screwed on the threaded hole 333 of the support base 33, and a pull member 54.

The engage rod 51 has its lower portion formed with a short lower rod 511 to be inserted in both the first insert hole 311 of the support arm 31 and the first connecting hole 321 of the fit block 32, as shown in FIG. 7. The lower rod 511 has its upper end provided with an annular lip 512 to rest on the bottom edge of the threaded hole 333 of the support base 33 so as to prevent the lower rod 511 from moving downward. The spring 52 has its lower end resting on the annular lip 512 of the engage rood 51 so that the spring 52 can be moved upward together with the engage rod 51 when the engage rod 51 is pulled upward. Further, the engage rod 51 has its upper end formed with a recessed neck 513 facing the lengthwise hole 531 of the threaded base 53. The lengthwise hole 531 of the threaded base 53 is formed with an annular stop wall 532 on the inner circumferential edge for the upper end of the spring 52 to rest thereon. The engage rod 51 has its recessed neck 513 inserted upward out of the hole 531 of the threaded base 53 to be connected with the pull member 54 so that the engage rod 51 can be moved up together with the pull member 54 when the pull member 54 is pulled upward.

In addition, the support base 33 is provided at its rear end with a fastening frame 34 slanting backward and upward and having two insert holes 35 matching with two insert holes at the lower end of the main frame 20, as shown in FIG. 3, with two bolts 36 respectively screwed through the two insert holes of the main frame 20 and the two insert holes 35 of the fastening frame 34 to fix the support base 33 on the lower end of the main frame 20, as shown in FIG. 2. Thus, the engage rod 51 of the elastic lock member 5 is always elastically pressed downward by the spring 52, and has its lower end inserted in both the first insert hole 311 of the support arm 31 and the first connecting hole 321 of the fit block 32, and its upper end extending out of the support base 33 and connected with the pull member 54 to be controlled by a user.

By so designing, the support arm 31 can be stabilized by the engage rod 51 to ensure the third wheel 4 of a golf club cart 2, which is pivotally assembled on the U-shaped frame 30 of the support arm 31, to move steadily, as shown in FIG. 2.

Figure 8:
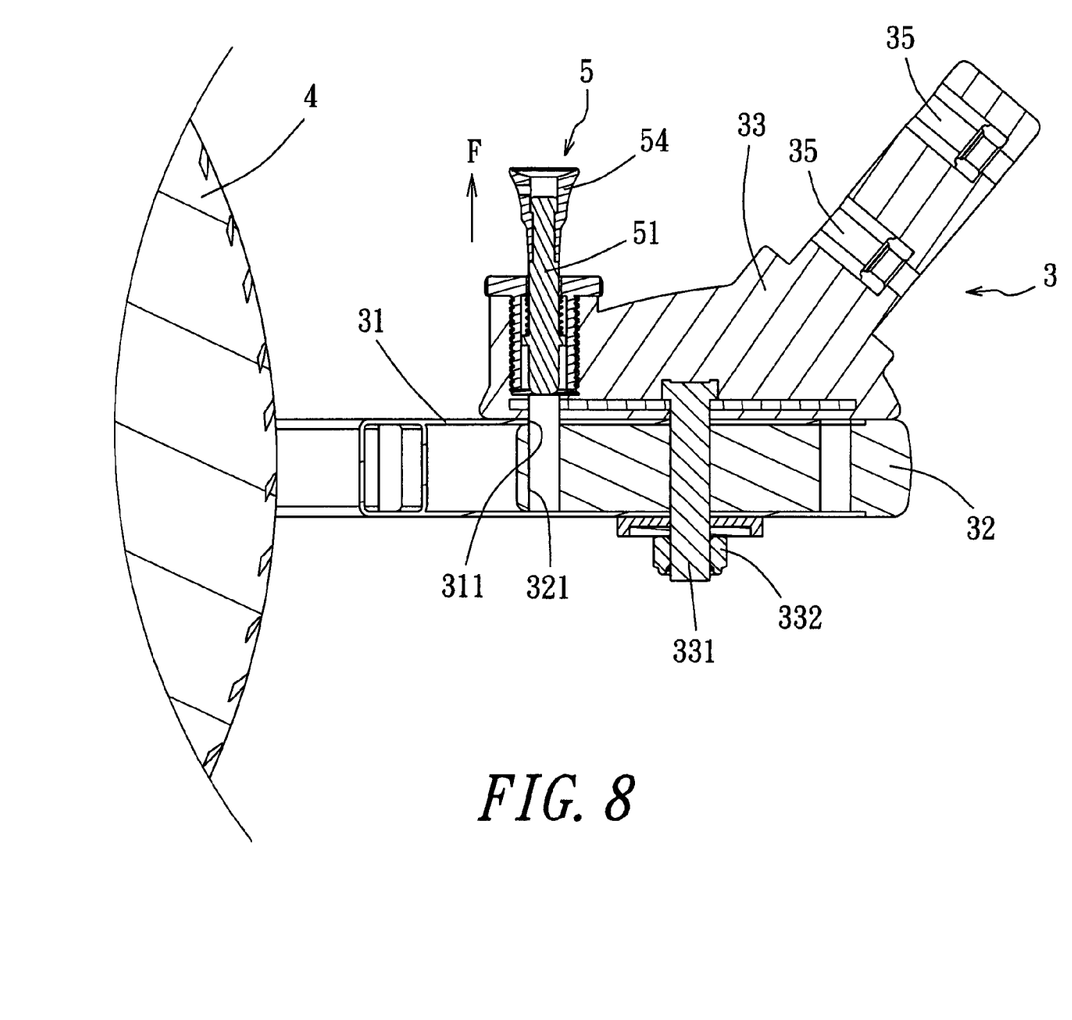
FIG. 8 is a cross-sectional view of the first preferred embodiment of the third wheel support frame in a disengaged condition in the present invention.
Figure 9:
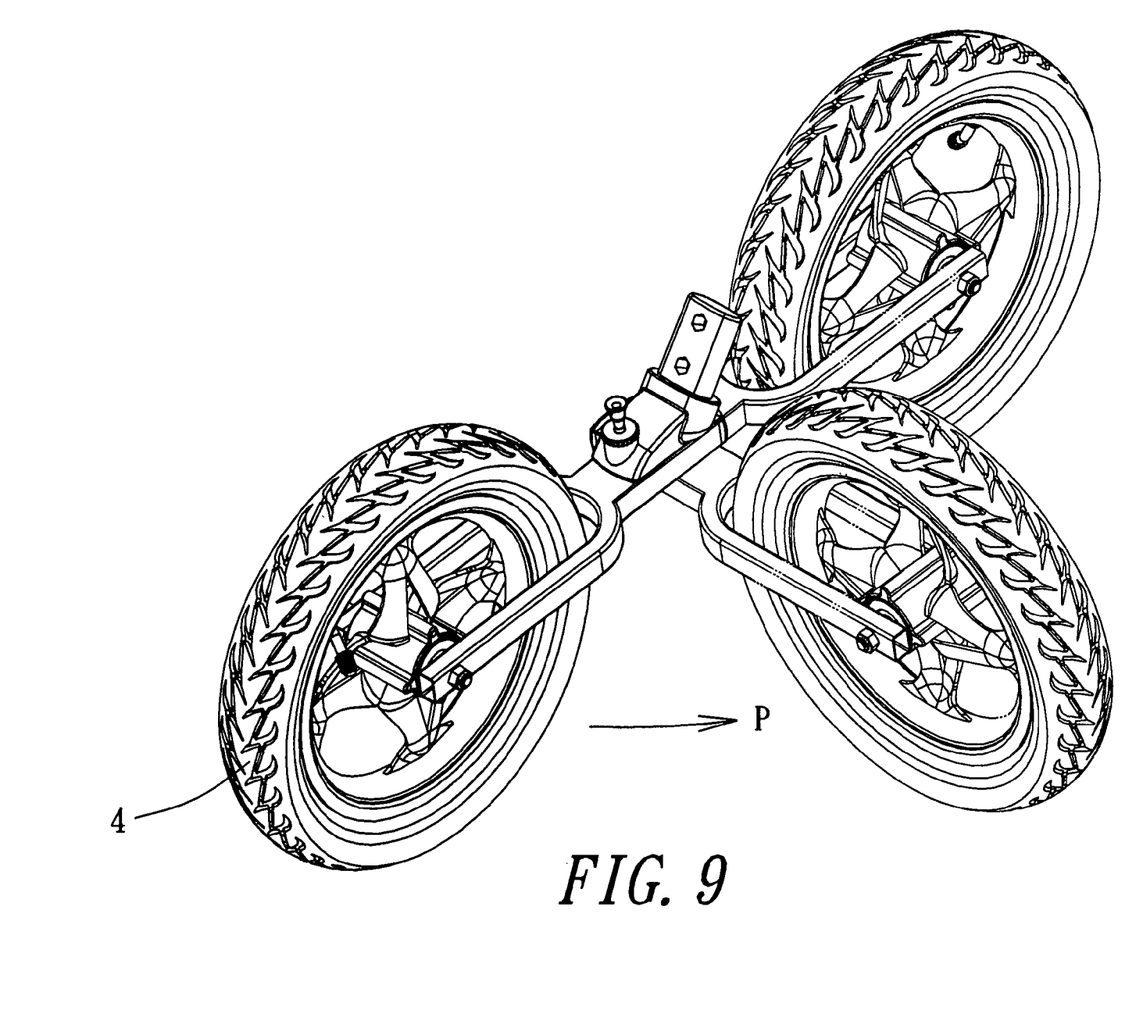
FIG. 9 is a perspective view of the first preferred embodiment of the third wheel of a golf club cart to be transversely collapsed in the present invention.
Figure 10:
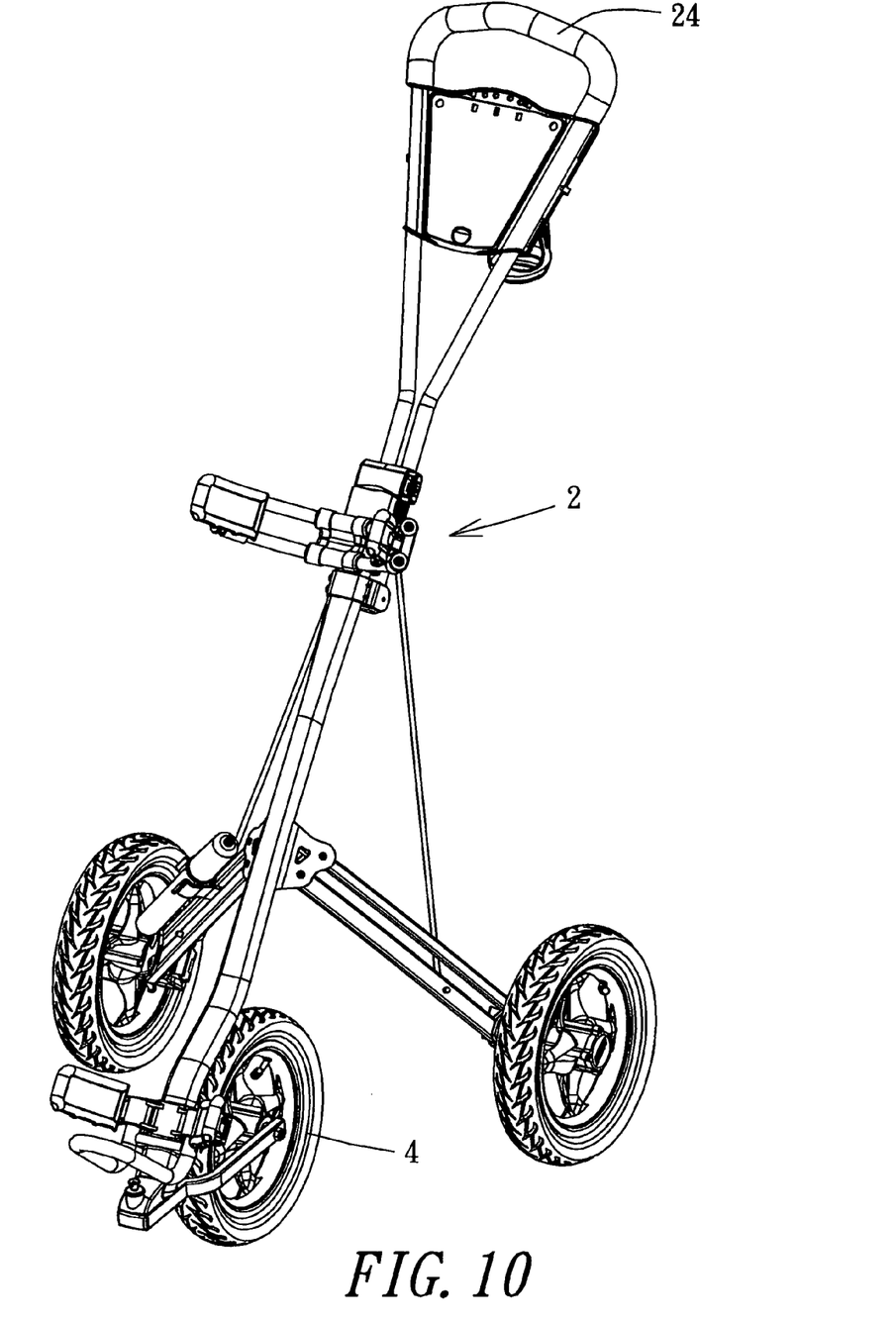
FIG. 10 is a perspective view of the first preferred embodiment of the third wheel of a golf club cart in a partially collapsed condition in the present invention.
Figure 11:
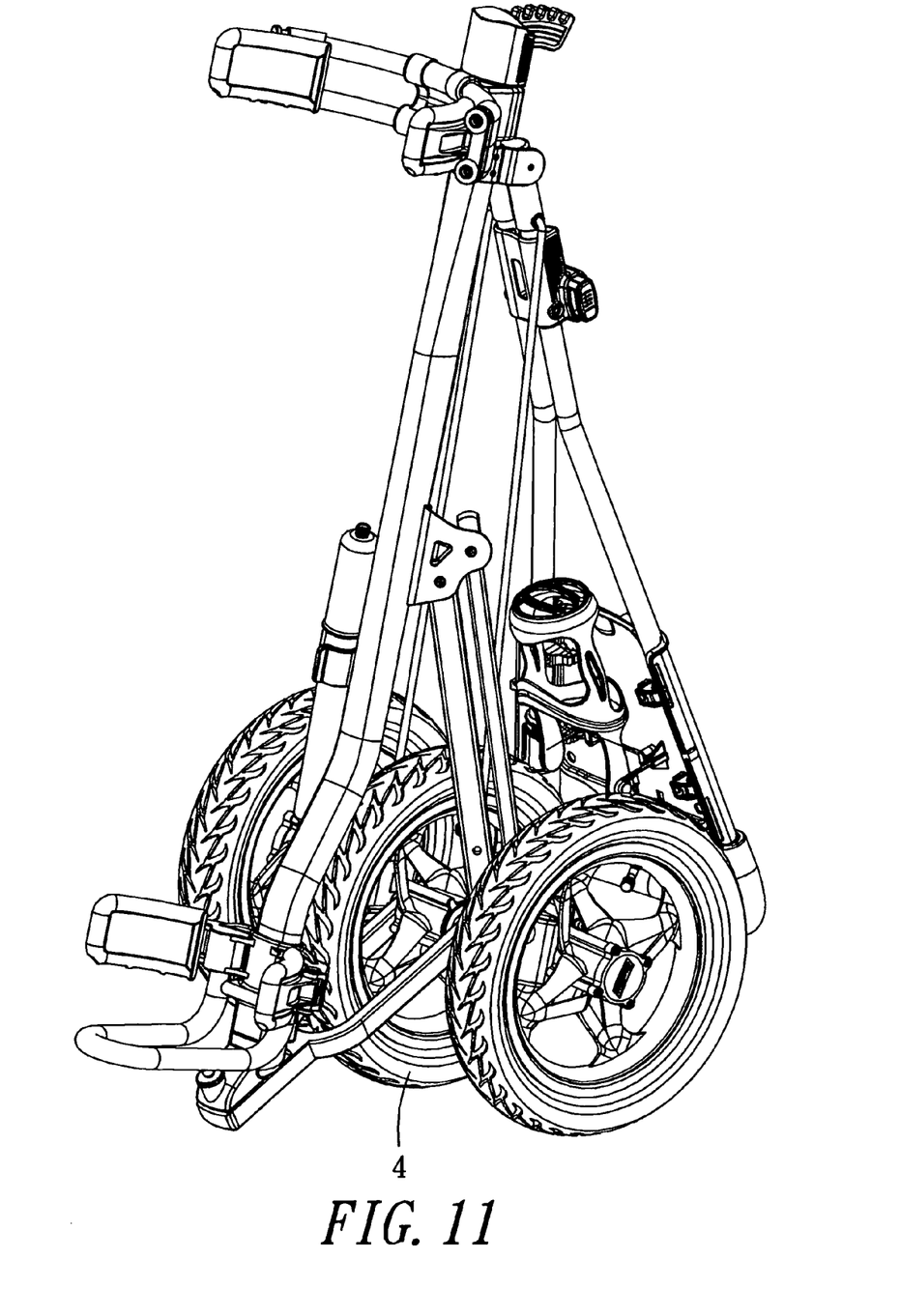
FIG. 11 is a perspective view of the first preferred embodiment of a golf club cart in a completely collapsed condition in the present invention.

To collapse the third wheel support frame 3 of the golf club cart 2, only pull the pull member 54 upward and the engage rod 51 will synchronously be moved upward and removed out of the first insert hole 311 of the support arm 31 and the first connecting hole 321 of the fit block 32, as shown in the direction indicated by an arrow F in FIG. 8. At this time, the support arm 31 is no longer restricted by the engage rod 51 and can be transversely turned around, as shown in the direction indicated by an arrow P in FIG. 9, being pivotally assembled with the support base 33. To turn around the support arm 31 transversely for collapsing the third wheel 4, only slightly press down the handle 24 of the golf club cart 2 to let the third wheel 4 a little separate from the ground and collapsed transversely, as shown in FIGS. 9 and 10. In case a golf club cart itself is provided with a collapsing device, it can be collapsed into a very small size, as shown in FIG. 11.

Figure 12:
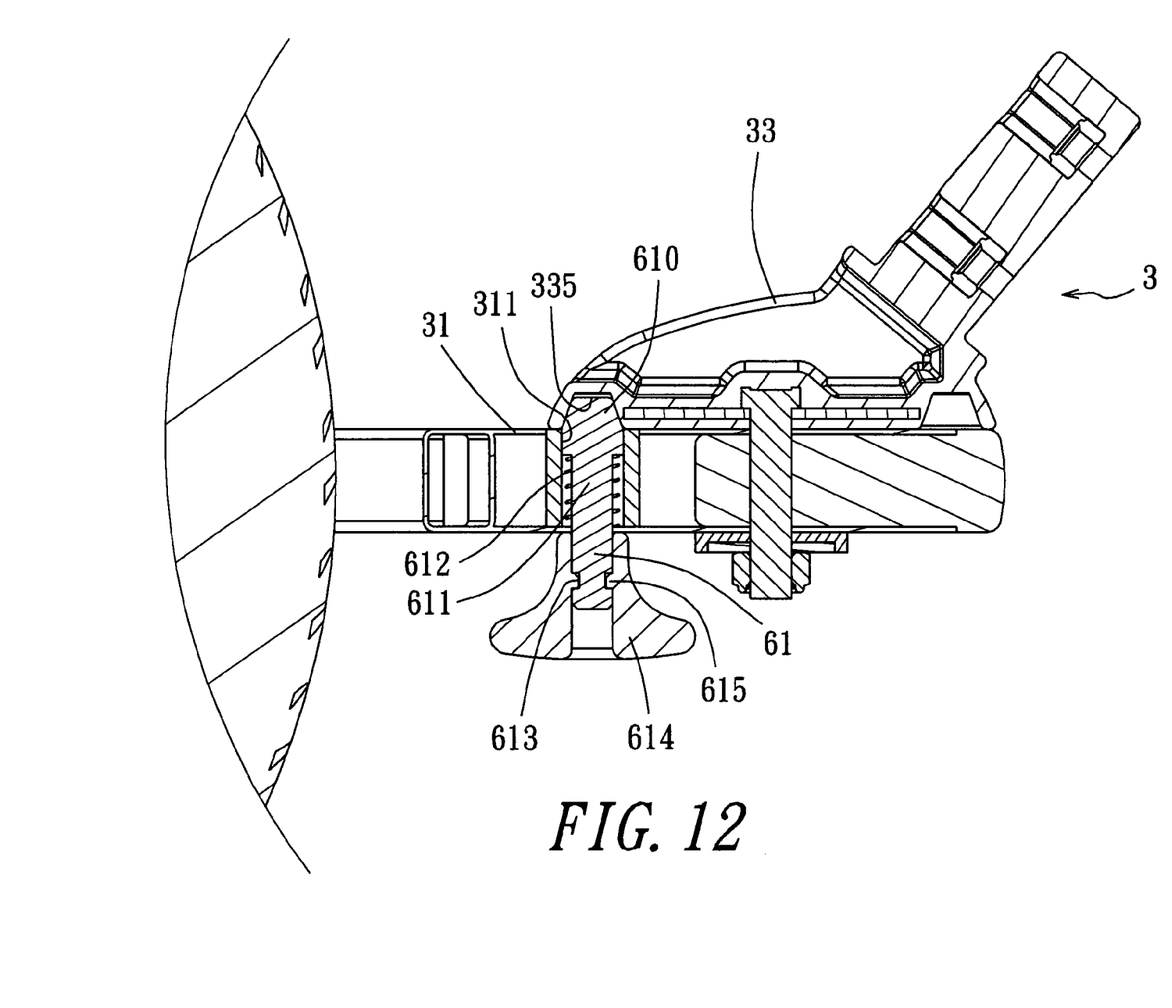
FIG. 12 is a magnified cross-sectional view of a second preferred embodiment of a third wheel collapsing device for a golf club cart in an engaged condition in the present invention.

A second preferred embodiment of a third wheel collapsing device for a golf club cart in the present invention, as shown in FIG. 12, is to have the third wheel support frame 3 pivotally assembled on the support arm 31. The support base 33 of the third wheel support frame 3 is formed with a recessed engage chamber 335 under a position facing the first insert hole 311 of the support arm 31, with an engage rod 61 inserted upward in the recessed engage chamber 335. The engage rod 61 has its upper end formed with an engage head 610 to be inserted in the recessed engage chamber 335 of the support base 33 and its intermediate portion under the engage head 610 formed with a thin straight rod 611 fitted around with a spring 612, and its lower portion formed with a recessed annular neck 613. A pull knob 614 is fitted on the lower portion of the straight rod 611 and has its outer projecting member 615 engaged and combined with the recessed annular neck 613 of the engage rod 61. Thus, the spring 612 has its opposite ends respectively pushing against the engage head 610 of the engage rood 61 and the upper end of the pull knob 614. In a normal condition, the spring 612 always elastically pushes upward the engage head 610 of the engage rod 61 and position it in the engage chamber 335 of the support base 33 so as to stably fix the third wheel support frame 3.

Figure 13:
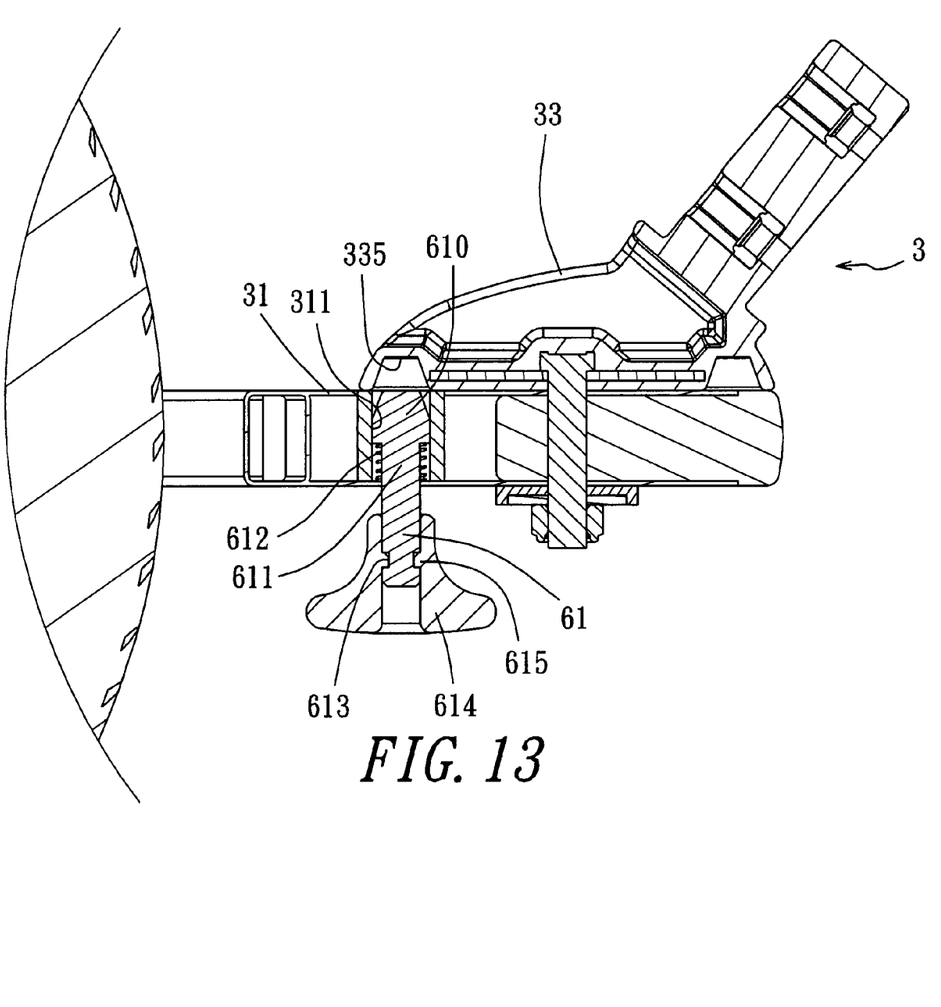
FIG. 13 is a magnified cross-sectional view of the second preferred embodiment of the third wheel collapsing device for a golf club cart in a disengaged condition in the present invention.

When the pull knob 614 is pulled downward, the engage head 610 of the engage rod 61 will synchronously be moved downward and compress the spring 612, and, after the engage head 610 of engage rod 61 is removed out of the engage chamber 335 of the support base 33, as shown in FIG. 13, the third wheel support frame 3 can be turned transversely and collapsed.

As can be understood from the above description, this invention has the following advantages, compared with the conventional third wheel collapsing device.

1. The third wheel of the golf club cart is convenient in operating be means of transversely collapsed, avoiding interference with the cart supporting surface and convenient in operating.
2. The third wheel of the golf club cart is stably positioned by the elastic lock member, which will never fall off even if the golf club cart moves on an extremely uneven road.

While the preferred embodiments of the invention have been described, it will be recognized and understood that various modifications may be made therein and the appended claims are intended to cover all such modifications that may fall within the spirit and scope of the invention.

I claim:

1. A third wheel collapsing device for a golf club cart comprising a third wheel support frame, said third wheel support frame comprising:

a U-shaped frame having its open end pivotally assembled with a third wheel, said U-shaped frame having its closed end extending outward and forming a hollow support arm, said support arm at least bored with a first and a second insert hole a fit block fitted in said hollow support arm, said fit block bored transversely with a first and a second connecting hole, said two connecting holes of said fit block respectively matching with said two insert holes of said support arm a support base assembled on said support arm, said support base having a pivotal shaft secured under the bottom, said pivotal shaft inserted downward through both said second insert hole of said support arm and said second connecting hole of said fit block, said pivotal shaft locked in position under said support arm by fasteners, said support base pivotally fixed on said support arm and able to rotate thereon, said support base provided with an elastic lock member in front of said pivotal shaft, said elastic lock member having an engage rod always pushed downward by a spring, said engage rod having its lower end inserted in both said first insert hole of said support arm and said first connecting hole of said fit block, said engage rod having its upper end extending out of said support base to be controlled by a user, said support base having its rear end fixed with a fastening frame extending backward and upward, said fastening frame fixedly assembled on the lower end of the main frame of a golf club cart said engage rod pulled upward and removed out of said first insert hole of said support arm and said first connecting hole of said fit block for collapsing said third wheel of said golf club cart, the handle of said golf club cart pressed downward slightly to let said third wheel separate from the supporting surface of the cart, said third wheel support frame being turned transversely to collapse said third wheel of said golf club cart.

2. The third wheel collapsing device for a golf club cart as claim in claim 1, wherein said elastic lock member to be received in the threaded hole of said support base is provided with said engage rod, a threaded base fitted around said engage rod and threaded into said threaded hole of said support base and a pull member; said engage rod having its lower portion formed with a short lower rod to be inserted in both said first insert hole of said support arm and said first connecting hole of said fit block, said lower rod of said engage rod having its upper end provided with an annular lip to rest on the bottom of said threaded hole of said support base, said annular lip preventing said lower rod of said engage rod from moving downward, said spring having its lower end resting on said annular lip of said engage rod, said spring able to be moved upward together with said engage rod when said engage rod is pulled upward, said engage rod having its upper end formed with a recessed neck, said threaded base bored with a lengthwise hole facing said recessed neck of said engage rod, said lengthwise hole of said threaded base having its inner circumferential edge provided inside with an annular stop wall, said spring having its upper end pushing against the lower edge of said stop wall, said neck of said engage rod extending upward out of said hole of said threaded base to be connected with said pull member, said engage rod moved up together with said pull member when said pull member is pulled upward.

3. The third wheel collapsing device for a golf club cart as claimed in claim 1, wherein said support base of said third wheel support frame is formed with a recessed engage chamber under the bottom to face said first insert hole of said support arm, and an engage rod is inserted upward through the bottom of said first insert hole of said support arm, said engage rod having its upper end formed with an engage head able to extend into said recessed engage chamber of said support base, said engage rod having the portion under said engage head formed with a thin straight rod fitted around with a spring, said straight rod having its lower portion formed with a recessed annular neck, a pull knob fixed on the lower portion of said straight rod and provided with an outer projecting member engaged and combined with said recessed neck of said engage rod, said spring having its upper and lower ends respectively pushing against said engage head of said engage rod and said pull knob.

\* \* \* \* \*